3,070,545
ADDITIVE FOR WELL FRACTURING FLUID
Gene D. Thompson, Houston, Eldred W. Hough, Austin, and Robert C. Lane, Pasadena, Tex., assignors, by mesne assignments, to Jersey Production Research Company, Tulsa, Okla., a corporation of Delaware
No Drawing. Filed Nov. 2, 1959, Ser. No. 850,072
10 Claims. (Cl. 252—8.55)

This invention relates to operations performed in wells. More particularly, this invention relates to the treatment of fluids such as hydraulic fracturing fluids used in fracturing subsurface formations to increase or initiate the production of oil from the fractured formations.

If a well has oil to produce and sufficient reservoir pressure to flow the oil to any fractures, additional oil can be produced as a result of fracturing.

Well fracturing is the splitting of rock by pressure. Hydraulic pressure applied to the rock of the well bore creates compressive and tensile forces around the hole. When these forces become great enough, they force the rock apart and start the split which is lengthened by the fluid pumped into the hole.

A good fracturing fluid must have among other things the following characteristics: (1) It must be fluid enough to be easily pumped by the usual well completion pumps. (2) It must be capable of holding a propping material, such as sand, in suspension while being pumped down the well, but it also must be capable of depositing the propping material in the cracks of the formation. (3) It must flow into the cracks in the formation, but there should be a minimum of fluid loss into the pores. (4) It must not plug the pores of the formation permanently or the capacity of the formation to produce oil will be damaged.

Some lease oils and some refined crudes, without the addition of agents thereto, possess enough of the desired characteristics to permit their use as fracturing fluids under some conditions. Some oils do not cause serious damage to the formation. However, in order to use these lease oils and refined crude oils, the pump rates necessary to keep the sand or other propping material in suspension must be very high. These high pump rates are often impossible because of the limitations of available pumping units. This is particularly so when pumping through tubing or small diameter casing. Such tubing and small diameter casing is found in various kinds of wells, as for example, the permanent well completion-type well wherein a tubular member is permanently placed within the well with its lower extremity located above the bottom of the well. Thus, most oils require the addition of one or more agents to achieve the desired results.

A good fracturing fluid must be easily pumped down the well, as formerly explained. A good fracturing fluid must also be capable of holding a propping material, such as sand, in suspension while being pumped down the well. This fracturing fluid must deposit the sand in the cracks of the formation to hold the cracks open. In general, the higher the viscosity of the fracturing fluid, the better the fluid for purposes of sand suspension. The higher viscosity fracturing fluids tend to hold the sand in suspension as the fracturing fluid is pumped into the well. The reason for holding the sand in suspension is to prevent the sand from settling into the bottom portion of the resulting fracture. Also, a good sand suspending fracturing fluid prevents the sand from bridging across the fracture. If no bridging of the sand occurs or the sand does not settle to the bottom of the fracture, a longer fracture is obtained and a better propping of the fracture. Unfortunately, however, if a high viscosity fracturing fluid is used because of its better sand suspension and anti-bridging capacity, the power requirements of the pumps is higher than the power requirement of the pumps if a low viscosity fluid is used. With high viscosity fracturing fluids, the effective power at the depth at which fracturing is to be made is much less than the input power at the wellhead. With low viscosity fracturing fluids, the effective power at the place of fracture is substantially the same as the input power at the wellhead. This feature is highly important when it is understood that the pressure required to make a fracture in the formations having oil is approximately one pound per square inch for each foot of depth. Hence, if a fracture is to be made at a depth of ten thousand feet or greater, the effective pressure at the place of fracture must be at least about ten thousand pounds per square inch.

A good agent for a fracturing fluid provides a low resistance to flow as the fluid is being pumped into the well and thus acts as a low viscosity fluid and yet provides sufficient strength to hold the propping material, such as sand, in suspension as the fluid is being pumped into the well and the fracture, thus acting in this capacity as a high viscosity fracturing fluid.

In addition to being easily pumpable and capable of holding the propping material in suspension, a good fracturing fluid must also flow into the cracks as they are formed, but must not flow into the pores. Flow into the pores of the fracture results in wasted fluid since high fluid loss into the pores leaves less fluid available for extending the fracture. A low fluid loss into the pores leaves more fluid available for extending the fracture. The longer and more extensive the fractures, the greater will be the productive capacity of the well when returned to production.

A still further requirement is that the pores must not be plugged permanently or the capacity of the formation to produce oil, when the well is returned to production, will be damaged.

A very good fracturing fluid which possesses all the desirable features heretofore mentioned is described in patent application Serial No. 791,363, filed February 5, 1959, entitled "Treatment of Wells" by Morris R. Morrow et al. The fracturing fluid described therein includes organic metal salt-metal soap complexes, which provide for the highly superior fracturing characteristics.

However, it has been found that if a certain amount of water is present in the fracturing fluid or additive described in Serial No. 791,363 above, it loses some of its desirable properties. Specifically, the fluid loss or flow of fluids into the pores of the fractured formation is increased to an undesirable extent. Accordingly, it is necessary to use a clean (all water removed) crude oil or a clean refined oil as a portion of the fracturing fluid or additive.

Usually, a lease or crude oil is used as the main constituent of a fracturing fluid. Often, from about .5 to 2% of the lease oil or crude oil consists of water. Hence, it would be highly desirable to provide the art with a fracturing fluid and fracturing fluid additive which possesses all of the aforementioned desirable properties and is water insensitive.

Through intensive studies, experiments, and tests, we have invented a new combination of constituents to provide the art with a fracturing fluid additive and fracturing fluid which possesses all of the afore-mentioned properties and at the same time is insensitive to the amount of water normally expected in a lease or crude oil.

Briefly, our invention comprises an additive for use in well operations which includes a major portion of a petroleum oil. A small portion of a calcium salt-calcium soap complex is included in the additive. Also included as a part of the additive is a minor portion of an alkaline-phosphate such as a sodium or potassium phosphate.

A new and improved fracturing fluid comprising our invention is obtained by adding the additive to a hydrocarbon carrier fluid such as the lease or crude oils found in the vicinity of the wells having the formations it is desired to fracture.

The preferred salt-soap complex employed in this invention is a calcium acetate-calcium soap complex. This preferred complex can be prepared in a mineral distillate in the following manner using the components listed below in the amounts shown.

| Ingredients: | Weight percent |
| --- | --- |
| Glacial acetic acid | 10.0 |
| Hydrofol acid 51 | 5.0 |
| Hydrated lime | 7.3 |
| Naphthenic-type mineral oil distillate having a viscosity of 55 SSU at 250° F. | 77.7 |

The hydrofol acid (hydrogenated fish oil acids corresponding to commercial stearic acid in degree of saturation) and hydrated lime and all of the mineral oil were charged to a fire-heated kettle equipped with agitating means and the mixture was heated to about 130° F. The glacial acetic acid was then added. Heating was continued and the temperature was raised to 500° F. to form the complex. The temperature was raised to 500° F. to assure the formation of the complex. After reaching a temperature of 500° F., heating was discontinued and the compound was cooled to 200° F. while stirring. Thereafter, the compound was homogenized at a high rate of shear in a Gaulin homogenizer.

The evidence for the formation of a new complex soap structure is based on X-ray diffraction data. These data show that the characteristic X-ray diffraction lines for both calcium soap and calcium acetate disappear during the course of manufacture of the compound having the ingredients and proportions shown above. Thus a separate and distinct chemical species different from a simple mixture of the calcium soap and the calcium acetate is formed.

The mineral oil charged to the fire-heated kettle is preferably a naphthenic-type mineral oil or aromatic oil having a viscosity of less than 75 SSU at 210° F. which acts as a dispersant for the complexes. However, a paraffinic oil may be used if desired. Synthetic oils may be used including di-esters, complex esters, silicone oils, etc. The amount of oil may range between 40% to 80% by weight.

The organic metal salt-metal soap complexes which are dispersed in a naphthenic-type mineral oil or other petroleum fluid can be made to vary in fluidity from a very fluid compound to a highly viscous compound by those skilled in the art. The compound may not be in convenient form for use in the field particularly if it is highly viscous. Hence, a feature of the invention described herein is a composition used as an additive and includes the calcium salt-calcium soap complex formed by any convenient manner such as described above, a petroleum oil, and the alkaline-phosphate.

The complexed material, the petroleum oil, and the alkaline-phosphate are thoroughly mixed together to form the additive. The additive is mixed until the desired fluidity is obtained. The petroleum oil may be either a crude oil or refined oil.

The preferred petroleum oil used in the additive is preferably a distillate or fracture from a distillate, such as a distillate extract. Its viscosity should be in the range of 100 to 1000 SSU/100° F. The preferred oil is a phenol extract of a distillate from coastal crude. Its viscosity is about 145 SSU/100° F. Mixing can be accomplished by a simple mixing in a drum with a "lightnin mixer," by circulating with a pump, or by means of a colloidal mill. The finally prepared additive consists preferably of a calcium acetate-calcium soap complex ranging from about .25 to 15% by weight of the additive and an alkaline-phosphate such as a sodium-phosphate ranging from about 1.5% to 6% by weight of the additive.

The additive can be placed in containers, such as cans suitable for holding fluids. Our new additive for use in well operations can then be added when desired to a lease crude at the well site or to refined oils or other fracturing fluids which have been transported to the well site. For example, the additive described above may be used by mixing the required amount into the fracturing fluid to be employed. The amount of additive used is preferably such that the final concentration of the additive in the fracturing fluid is in the range of from 0.01 to 8% by volume of the hydrocarbon carrier fluid. Up to 7 or 8% by volume of the additive in the fracturing fluid can be used, the increased percentage giving desired characteristics to the fluid. It has been found, however, that the addition of more than 7 or 8% gives no appreciable improved results. The actual amount required depends upon the fluid being used and can be initially determined by a laboratory test. The test used for this evaluation is the API Code No. 29, Fourth Edition, May 1957, "Fluid Loss Test."

The term "alkaline-phosphate" is meant to include the alkaline salts of the various phosphoric acids. These include the hypophosphates, orthophosphates, metaphosphates, and pyrophosphates. Monosodium phosphate, tetrasodium phosphate, and sodium tripolyphosphate are very effective in making the new additive and fracturing fluid water insensitive. The preferred is sodium tripolyphosphate.

Tables I and II show the results of a series of API Code 29 Fluid Loss Tests run to evaluate the effectiveness of the additive in reducing fluid loss when quantities of salt water are present in this crude. The tests employed Doward San Andres crude as the carrier fluid. The ingredients were mixed in a Waring Blendor and were run at 100° F. A fluid loss of less than 30 cc. per 30 minutes is considered satisfactory.

An examination of Table I shows that the Dorward San Andres crude was very ineffective as far as fluid loss characteristics are concerned. 250 cc. were lost in 18 seconds. With the addition of an additive containing the calcium acetate-calcium soap complexes but not including the sodium tripolyphosphate, the fracturing fluid was effective as far as fluid loss was concerned as long as no water was present. However, with the presence of as little as 1% sodium chloride water, the fluid loss became unsatisfactory.

*Table 1*

| Additive (no alkaline-phosphate), percent by volume | 3% NaCl, Water, percent by volume | Fluid Loss, cc./30 min. |
| --- | --- | --- |
| Native Crude | 0 | 250/18 sec. |
| 2 | 0 | 15 |
| 4 | 0 | 10 |
| 2 | 1 | 250/168 sec. |
| 4 | 1 | 99 |
| 6 | 1 | 90 |

Table II shows the affects of our new additive and fracturing fluid on the fluid loss characteristics.

An examination of Table II shows that our new additive provides a fracturing fluid which has satisfactory fluid loss even with as much as 10% water in the fracturing fluid. From the data of Table II, it is further seen that there is an optimum amount of sodium tripolyphosphate which should constitute a portion of the additive, and if this amount is exceeded, an increase rather than a further decrease in the fluid loss results. However, it is clearly seen that in the range of ½ to 2% water in the crude which is a range of water percentage normally expected to be present in lease crude; an amount of sodium tripolyphosphate ranging from say 1.5 to 6.0% by weight if the additive gives very desirable fluid loss results in the Dorward San Andres crude.

*Table II*

| Additive (including Sodium Tripoly-phosphate), percent by volume | 3% NaCl, Water, percent by Volume | Sodium Tripoly-phosphate (percent by wt. of additive) | Fluid Loss, cc./30 Min. |
|---|---|---|---|
| 2 | 0 | 2.97 | 11 |
| 2 | 1 | 2.97 | 28.5 |
| 2 | 2 | 2.97 | 24 |
| 2 | 3 | 2.97 | 28 |
| 2 | 5 | 2.97 | 15 |
| 2 | 10 | 2.97 | 10 |
| 2 | 1 | 4.1 | 11.5 |
| 2 | 2 | 4.1 | 21 |
| 2 | 3 | 4.1 | 28.5 |
| 2 | 5 | 4.1 | 22 |
| 3 | 1 | 4.1 | 7.5 |
| 3 | 2 | 4.1 | 22 |
| 3 | 3 | 4.1 | 26 |
| 3 | 5 | 4.1 | 29 |
| 2 | 1 | 6.0 | 69 |
| 2 | 2 | 6.0 | 52 |
| 2 | 3 | 6.0 | 42 |
| 2 | 5 | 6.0 | 27 |

From the foregoing it is seen that our new fracturing fluid including our new fluid additive has all the requirements of a good fracturing fluid. It acts as a low viscosity fluid while being pumped so that the effective power at the place of fracture is substantially the same as the power input at the wellhead; it holds sand in suspension while the fluid is being pumped down the well and deposits the sand in the cracks of the formation; it flows into the cracks of the formation, but not through the pores, that is, it has a low fluid loss. It temporarily plugs the pores of the formation but is washed from the pores by the produced oil when the oil is produced. Because this fluid is easily washed from the pores, no solvent is needed. No damage is done to the formation, and it is water insensitive.

We claim:

1. An additive for use in well operations comprising: a major portion of petroleum oil; a minor portion of a calcium salt-calcium soap complex ranging from about .25 to 15% by weight; and a minor portion of an alkali metal phosphate ranging from 1.5 to 6.0% by weight of the additive.

2. An additive in accordance with claim 1 wherein the petroleum oil is a phenol extract of a distillate from a crude oil.

3. An additive in accordance with claim 2 wherein the alkali metal phosphate is a sodium-phosphate.

4. An additive in accordance with claim 3 wherein the sodium-phosphate is tripolyphosphate.

5. An additive for use in well operations comprising: a major portion of petroleum oil; a minor portion of a calcium acetate-calcium soap complex ranging from about .25 to 15% by weight; and a sodium-phosphate ranging from 1.5 to 6.0% by weight.

6. A fracturing fluid comprising: a hydrocarbon carrier fluid; and a small portion of an additive including a major portion of petroleum oil, calcium salt-calcium soap complexes ranging from about .25 to 15% by weight of the additive, and a minor portion of an alkali metal phosphate ranging from 1.5 to 6.0% by weight of the additive.

7. A fracturing fluid in accordance with claim 6 wherein the additive ranges from about 0.01 to 8.0% by volume of the hydrocarbon carrier fluid.

8. A fracturing fluid in accordance with claim 7 wherein the alkali metal phosphate is a sodium-phosphate.

9. A fracturing fluid in accordance with claim 8 wherein the sodium-phosphate is tripolyphosphate.

10. A method of treating a well to increase the productivity of a formation penetrated by the well which comprises pumping a low-penetrating liquid into said well including said formation, said low-penetrating liquid including a propping material and an additive ranging from 0.1 to 8.0% by volume of the low-penetrating liquid, said additive including calcium salt-calcium soap complexes ranging from about .25 to 15% by weight of the additive, and a sodium-phosphate ranging from 1.5 to 6.0% by weight of the additive, applying pressure against said formation until a formation breakdown pressure is reached causing a fracture in the formation, continuing to apply pressure to displace low-penetrating fluid into the pores of said formation and place propping material in the fracture, and thereafter producing said well, whereby said liquid is removed from said pores.

References Cited in the file of this patent
UNITED STATES PATENTS

| 2,846,392 | Morway et al. | Aug. 5, 1958 |
| 2,869,643 | Schuessler et al. | Jan. 20, 1959 |